United States Patent [19]

Chern et al.

[11] Patent Number: 5,305,124
[45] Date of Patent: Apr. 19, 1994

[54] VIRTUAL IMAGE DISPLAY SYSTEM

[75] Inventors: Mao J. Chern, Rancho Palos Verdes, Calif.; Steve A. Stringfellow, Oakland, Mich.; Howard S. Newberg, Los Angeles, Calif.

[73] Assignee: Hughes Aircraft Company, Los Angeles, Calif.

[21] Appl. No.: 864,861

[22] Filed: Apr. 7, 1992

[51] Int. Cl.$^5$ .......................... G02B 5/32; G02B 27/10
[52] U.S. Cl. ...................................... 359/13; 359/630; 359/631; 359/633
[58] Field of Search ................... 359/13, 15, 630, 631, 359/633, 634, 858, 14; 340/705

[56] References Cited

U.S. PATENT DOCUMENTS

| | | | |
|---|---|---|---|
| 4,530,564 | 7/1985 | Close | 359/15 |
| 4,652,870 | 3/1987 | Steward | 359/633 |
| 4,729,634 | 3/1988 | Raber | 359/630 |
| 4,761,056 | 8/1988 | Evans et al. | 359/858 |
| 4,763,990 | 8/1988 | Wood | 359/630 |
| 4,973,942 | 11/1990 | Iino | 340/705 |
| 5,050,962 | 9/1991 | Monnier et al. | 359/13 |

FOREIGN PATENT DOCUMENTS

| | | | |
|---|---|---|---|
| 0278395 | 8/1988 | European Pat. Off. | 359/13 |
| 0286962 | 10/1988 | European Pat. Off. | 340/705 |
| 0007039 | 1/1990 | European Pat. Off. | 359/630 |
| 0058317 | 3/1988 | Japan | 340/705 |
| 01769604 | 7/1990 | Japan | 359/13 |
| 0107119 | 5/1991 | Japan | 359/13 |
| 2123974 | 2/1984 | United Kingdom | 359/13 |

Primary Examiner—Bruce Y. Arnold
Assistant Examiner—R. D. Shafer
Attorney, Agent, or Firm—L. A. Alkov; W. K. Denson-Low

[57] ABSTRACT

A virtual image display system for displaying a relatively large virtual image to a user derived from a relatively small image source. A lens group is provided for amplifying an image provided by the image source. A plurality of reflecting elements are provided for magnifying the image provided by the lens group and for displaying the relatively large virtual image. Several embodiments are provided that include on-axis and off-axis reflecting versions, and a holographic virtual image version. Conventional lenses and reflecting optics are used to provide the on- and off-axis versions of the system, while a holographic reflecting element is used to provide a holographic virtual image. A window element may also be employed to minimize ambient reflection viewed by the user and eliminates ambient reflection to reduce the user's eye fatigue. The display system improves a user's viewing comfort by positioning the image at a distance matching the visual requirements of the user's eye. The large image size also improves the legibility and readability of the display. The present system is especially useful for computer monitor or TV applications and the color version is useful in applications where selected colors are to be highlighted.

3 Claims, 2 Drawing Sheets

VIRTUAL IMAGE DISPLAY SYSTEM

BACKGROUND

The present invention relates generally to virtual image display optical systems, and more particularly, to a wide spectral bandwidth virtual image display optical system as a display monitor for computer applications.

Conventional display systems such as CRT monitors or LCD panels are direct-view systems in which the users view a display image on the monitor surface. For a large screen size, the display is correspondingly larger in size. As a result, the conventional CRT monitors are not only costly, but are also bulky and heavy.

Prior art related to the present invention include U.S. Pat. No. 4,294,515 issued to Kaufman and U.S. Pat. No. 3,940,104 issued to Withrington. The Kaufman patent teaches a virtual image system using spherical mirrors. This approach is typically useful for a display system with small field-of-view (small display screen size). The Withrington patent teaches an optical system that is used in a transmissive configuration for head-up display applications with image distance at infinity. The system typically includes one aspherical optical mirror surface for displaying a monochrome image.

SUMMARY OF THE INVENTION

The present invention is a virtual image display system for displaying a relatively large virtual image to a user. The system comprises a relatively small image source for providing an image that is to be viewed by the user. A lens group is provided for amplifying the image provided by the image source. First and second reflecting elements may be provided for magnifying the image provided by the lens group and for displaying the relatively large virtual image to the user. An optional window element may also be employed to minimize ambient reflection viewed by the user. Several embodiments are disclosed that include on-axis and off-axis versions and a holographic virtual image version. Conventional lenses and reflecting optics are used to provide the on- and off-axis versions of the system, while a holographic reflecting element is used in a third embodiment of the system to provide a holographic virtual image.

The virtual image display system of the present invention provides a large screen image in a compact unit. The present display system uses a small size image source in combination with magnifying relay optics to create a high quality large screen size display image. The image source may be a monochrome, black and white, color, or sequential color source. The display system improves a user's viewing comfort by positioning the image at a distance matching the visual requirements of the user's eye. The large image size also improves the legibility and readability of the image source. The present system is especially useful for computer monitor or TV applications and a color version is useful in applications where selected colors are to be highlighted.

The present virtual image display system provides for the use of a smaller image source and magnifying optics to generate a large screen image in a smaller package. The large image size also improves the legibility and readability of the display. The present system also eliminates a majority of the ambient reflection to reduce the user eye fatigue when it incorporates the window element. Using a virtual image display also results in a lower overall system cost.

The present invention is different from conventional displays in that it provides for a virtual image system that is comprised of two aspherical mirrors to compensate for images with a large field-of-view and to provide for a full color image. The eye relief is typically in the order of 12 inches to about 16 inches in distance. The aspherical mirrors may be fully reflective, or may be multi-layer narrowband (or holographic) to provide multiple image depth for a 3-D image display.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
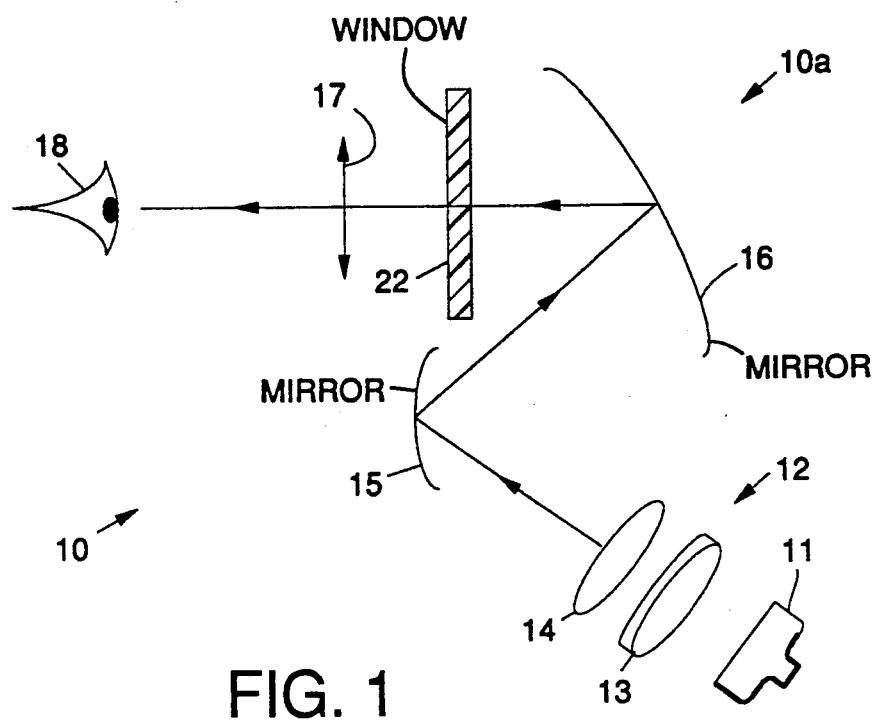
FIG. 1 shows an off-axis configuration of a virtual image display system in accordance with the principles of the present invention.

Referring to the drawing figures, several possible configurations of a virtual image display system 10 are provided for by the present invention. FIG. 1 shows an off-axis configuration of a virtual image display system 10a in accordance with the principles of the present invention. In this configuration, video or graphic information is generated by a small size image source 11, such as a cathode ray tube (CRT). The image source 11 may be a monochrome, black and white, or color image source 11. The image source 11 may comprises a solid state image source, such as a liquid crystal display panel. In addition, a color sequential high resolution image source 11, such as liquid crystal color shutter with black and white CRT tube, is most advantageous as a high resolution color image source 11 for the virtual image system 10, in any of its configurations. The image provided by the image source 11 is amplified through a lens group 12 comprising at least two optical lenses 13, 14 and is then magnified by first and second reflecting mirrors 15, 16 to project a large screen image 17 to a user 18. The system 10a may also include a window element 22, typically configured in elliptical shape, to minimize ambient reflection observed by the user 18.

Figure 2:
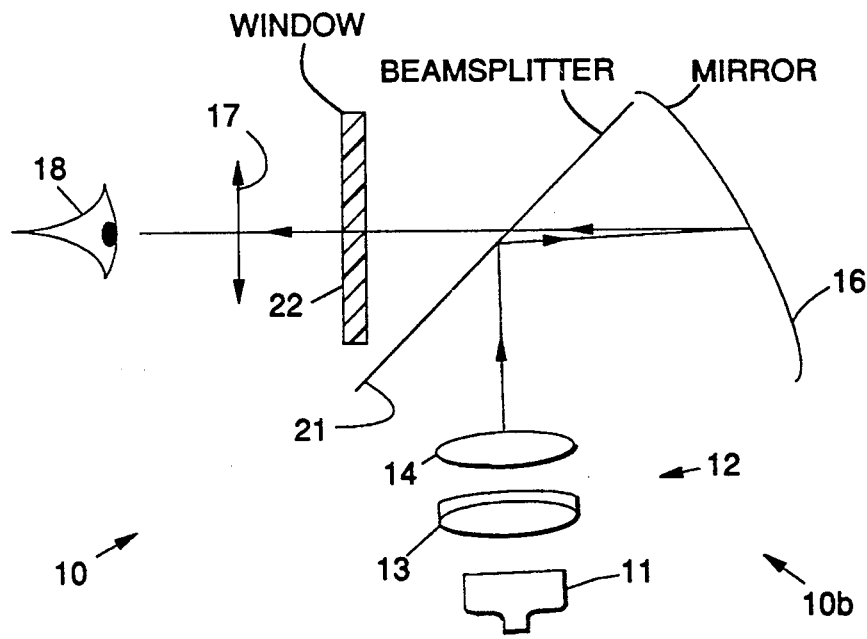
FIG. 2 shows an on-axis or near on-axis configuration of a virtual image display system in accordance with the principles of the present invention.

FIG. 2 shows an on-axis or near on-axis configuration of a virtual image display system 10b in accordance with the present invention. In this configuration, video or graphic information is again generated by the small size image source 11. The image provided by the image source 11 is amplified through a lens group 12 comprising at least two optical lenses 13, 14 and is then reflected by a beamsplitter 21 to a reflecting mirror 16 that projects the large screen image 17 for viewing by the user 18. The lens group 12 may also comprise a magnifying optical system that includes a catadioptric or catatrioptric optical system, for example. The system 10c may also include the window element 22 to minimize the ambient reflection observed by the user 18.

The optical lenses 13, 14 and mirrors 15, 16 may be arranged in the off-axis configuration as shown in FIG. 1, or may also be arranged in the on-axis or near on-axis configuration as shown in FIG. 2 by replacing the first mirror 15 with the beam-splitter 21, and appropriately adjusting the locations of the image source 11 and lens group 12. Different configurations require different optical correction to compensate for optical aberration and dispersion. The on-axis configuration of FIG. 2 generally provides a larger field-of-view and maintains excellent optical performance characteristics. System resolution is determined by the resolution of the image source 11.

Figure 3:
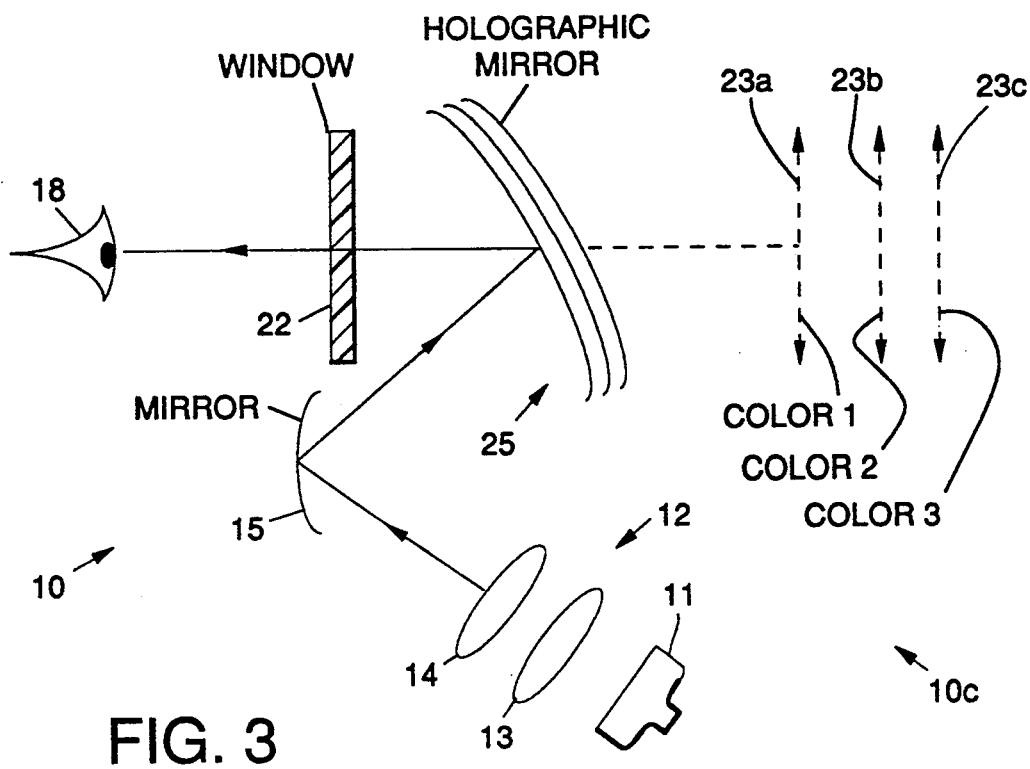
FIG. 3 shows a 3-D configuration of a virtual image display system in accordance with the principles of the present invention.

The reflecting mirror 16 may be designed as a holographic optical element 25 (holographic mirror 25) so that image distances for different colors are slightly different. This configuration creates a 3-D image 23 for viewing as is illustrated in FIG. 3. More specifically, FIG. 3 shows a 3-D configuration for a virtual image display system 10c in accordance with the principles of the present invention. Video or graphic information is again generated by the image source 11. In this embodiment, the color sequential high resolution image source 11, comprising a liquid crystal color shutter with black and white CRT tube, may be advantageously employed. The image provided by the image source 11 is amplified through the lens group 12 comprising at least two optical lenses 13, 14 and is then magnified by a first reflecting mirror 15 and the holographic mirror 25 to project a large screen 3-D virtual image 23 that is viewable by the user 18. The system 10c may also include the window element 22, typically configured in elliptical shape, to minimize the ambient reflection to the user 18.

As is seen in FIG. 3, the holographic mirror 25 includes three coatings or gratings that cause separate colors (color 1, color 2, color 3) to be imaged at separate distances 23a, 23b, 23c behind it. This configuration is desirable in applications where a certain color, say red or green, are to be made more prominent, such as in an automobile instrument panel application, for example. The holographic mirror 25 may also comprise two holographic mirror elements having respective predetermined optical powers for different wavelengths to provide for a three dimensional display system. The holographic mirror elements may be coherent or incoherent mirror elements.

The design of the optical elements to achieve appropriate focal lengths and desired holographic characteristics are well-known to those skilled in the art. The details of their design and construction will not be detailed herein, since they are believed to be routine in the art.

Figure 4:
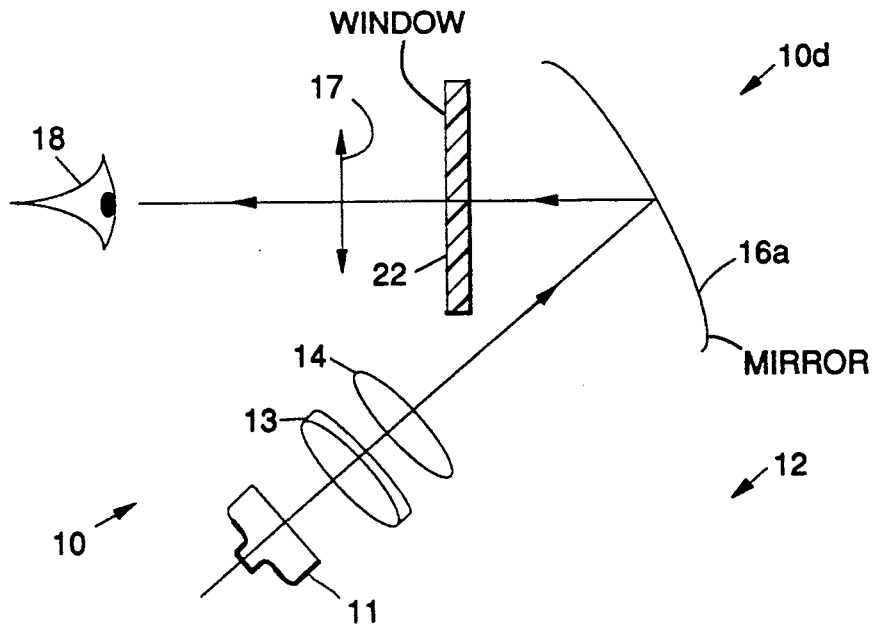
FIG. 4 shows an embodiment of a virtual image display system that does not require reflective elements.

FIG. 4 shows an embodiment of a virtual image display system 10d that does not require reflective elements. The display system 10d comprises a small size image source 11. The image provided by the image source 11 is amplified through a lens group 12 comprising at least two optical lenses 13, 14 and is then reflected by a reflecting mirror 16a to project a large screen image 17 to a user 18. The lens group 12 may also comprise a magnifying optical system that includes a catadioptric or catatrioptric optical system, for example. The system 10d may also include the window element 22, typically configured in elliptical shape, to minimize ambient reflection observed by the user 18.

The virtual image display systems 10 of the present invention improve a user's viewing comfort by positioning the image 17, 23 at a distance matching the visual requirements of the user's eye. The large image size also improves the legibility and readability of the image source 11. The present system 10 is especially useful for computer monitor or TV applications and the color version is useful in applications where selected colors are to be highlighted.

Thus there has been described a new and improved wide spectral bandwidth virtual image display optical system. It is to be understood that the above-described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A virtual image display system for displaying a relatively large virtual image to a user, said system comprising:
    a relatively small image source for providing an image that is to be viewed by the user;
    a concave reflecting mirror;
    a lens group for amplifying the image provided by the image source, and for projecting the image by way of the concave reflecting mirror at a comfortable viewing distance relative to the user; and
    a magnifying optical system comprising the concave reflecting mirror and further comprising a holographic mirror wherein the holographic mirror comprises two holographic mirror elements having respective predetermined optical powers for different wavelength to provide for a three dimensional display system.

2. The virtual image display system of claim 1 wherein the holographic mirror elements are coherent mirror elements.

3. The virtual image display system of claim 1 wherein the holographic mirror elements are incoherent mirror elements.

* * * * *